United States Patent
Rajadurai et al.

(10) Patent No.: US 10,631,162 B2
(45) Date of Patent: Apr. 21, 2020

(54) METHOD AND APPARATUS TO PERFORM DEVICE TO DEVICE COMMUNICATION IN WIRELESS COMMUNICATION NETWORK

(71) Applicant: Samsung Electronics Co., Ltd., Suwon-si, Gyeonggi-do (KR)

(72) Inventors: Rajavelsamy Rajadurai, Bangalore (IN); Anil Agiwal, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 48 days.

(21) Appl. No.: 15/033,420

(22) PCT Filed: Oct. 30, 2014

(86) PCT No.: PCT/KR2014/010297
§ 371 (c)(1),
(2) Date: Apr. 29, 2016

(87) PCT Pub. No.: WO2015/065063
PCT Pub. Date: May 7, 2015

(65) Prior Publication Data
US 2016/0255502 A1 Sep. 1, 2016

(30) Foreign Application Priority Data

Oct. 30, 2013 (IN) .......................... 4896/CHE/2013
Oct. 27, 2014 (IN) .......................... 4896/CHE/2013

(51) Int. Cl.
*H04W 12/04* (2009.01)
*H04L 9/32* (2006.01)
(Continued)

(52) U.S. Cl.
CPC .......... *H04W 12/04* (2013.01); *H04L 9/0825* (2013.01); *H04L 9/0847* (2013.01);
(Continued)

(58) Field of Classification Search
None
See application file for complete search history.

(56) References Cited

U.S. PATENT DOCUMENTS 6,085,322 A * 7/2000 Romney ............... G06F 21/645
  705/76
6,530,020 B1 * 3/2003 Aoki ........................ H04L 9/16
  380/278
(Continued)

FOREIGN PATENT DOCUMENTS

CN 1647442 A 7/2005
CN 101160779 A 4/2008
(Continued)

OTHER PUBLICATIONS

Chinese Office Action dated Jul. 9, 2019, issued in Chinese Application No. 201480060884.8.

Primary Examiner — Saleh Najjar
Assistant Examiner — Michael W Chao
(74) Attorney, Agent, or Firm — Jefferson IP Law, LLP

(57) ABSTRACT

A method and an apparatus for verifying identity of a direct communication message using asymmetric keys in a wireless communication network comprising a plurality of electronic devices is provided. The method includes distributing a public key associated with a second electronic device among a plurality of electronic devices by a Device-to-Device (D2D) server. The method includes receiving the direct communication message from the second electronic device at a first electronic device. The direct communication message comprises a digital signature generated using a private key associated with the second electronic device. Further, the method includes verifying the identity of the direct communication message using the public key associated with the second electronic device.

8 Claims, 8 Drawing Sheets

(51) Int. Cl.
*H04L 9/08* (2006.01)
*H04W 76/14* (2018.01)
*H04L 29/06* (2006.01)

(52) U.S. Cl.
CPC ........ *H04L 9/3247* (2013.01); *H04L 63/0442* (2013.01); *H04L 63/061* (2013.01); *H04L 63/062* (2013.01); *H04W 12/04031* (2019.01); *H04W 76/14* (2018.02); *H04L 2209/80* (2013.01)

(56) References Cited

U.S. PATENT DOCUMENTS

| | | | |
|---|---|---|---|
| 6,834,112 B1* | 12/2004 | Brickell | G06F 21/31 380/279 |
| 6,912,656 B1* | 6/2005 | Perlman | H04L 9/0825 709/206 |
| 7,146,009 B2* | 12/2006 | Andivahis | H04L 63/06 380/277 |
| 8,108,678 B1* | 1/2012 | Boyen | H04L 9/0847 380/30 |
| 8,549,658 B2* | 10/2013 | Kolavennu | H04L 41/0806 726/21 |
| 8,594,632 B1* | 11/2013 | Azizi | H04W 12/06 455/411 |
| 8,848,579 B1* | 9/2014 | Reeves | H04M 15/00 370/271 |
| 9,002,018 B2* | 4/2015 | Wilkins | H04L 9/006 380/281 |
| 9,111,221 B1* | 8/2015 | Kelly | G08B 13/19 |
| 9,220,012 B1* | 12/2015 | Inamdar | H04W 12/08 |
| 9,300,473 B2* | 3/2016 | Nix | H04W 4/70 |
| 9,392,637 B1* | 7/2016 | Lesner | G02B 27/017 |
| 9,843,986 B2* | 12/2017 | Poitau | H04W 76/14 |
| 9,876,767 B2* | 1/2018 | Cheng | H04W 4/08 |
| 9,898,729 B2* | 2/2018 | Aabye | G06Q 20/3227 |
| 9,903,940 B2* | 2/2018 | Lohier | G06F 21/88 |
| 9,923,721 B2* | 3/2018 | Adrangi | H04W 76/14 |
| 9,923,879 B1* | 3/2018 | Ziraknejad | H04L 63/06 |
| 9,924,354 B2* | 3/2018 | Zhang | H04W 12/04 |
| 9,955,338 B2* | 4/2018 | Johnsson | H04W 76/14 |
| 9,955,485 B2* | 4/2018 | Jung | H04W 76/14 |
| 10,033,706 B2* | 7/2018 | Bicket | H04W 4/70 |
| 10,292,200 B2* | 5/2019 | Jung | H04W 76/27 |
| 2003/0147536 A1* | 8/2003 | Andivahis | H04L 63/06 380/277 |
| 2003/0204722 A1* | 10/2003 | Schoen | H04L 51/04 713/156 |
| 2004/0098589 A1* | 5/2004 | Appenzeller | H04L 9/3073 713/170 |
| 2005/0084100 A1* | 4/2005 | Spies | H04L 47/10 380/30 |
| 2006/0083187 A1* | 4/2006 | Dekel | H04L 63/0853 370/310 |
| 2006/0168343 A1* | 7/2006 | Ma | H04W 52/38 709/245 |
| 2006/0236106 A1 | 10/2006 | Patel | |
| 2007/0234041 A1 | 10/2007 | Lakshmeshwar et al. | |
| 2007/0282748 A1 | 12/2007 | Saint Clair et al. | |
| 2009/0037732 A1* | 2/2009 | Boccon-Gibod | G06F 21/10 713/168 |
| 2009/0327731 A1* | 12/2009 | Appenzeller | H04L 9/006 713/171 |
| 2010/0125732 A1 | 5/2010 | Cha et al. | |
| 2010/0153727 A1 | 6/2010 | Reznik et al. | |
| 2011/0078439 A1 | 3/2011 | Mao et al. | |
| 2011/0185174 A1* | 7/2011 | Blewett | H04L 9/083 713/168 |
| 2011/0271334 A1* | 11/2011 | Yang | H04L 63/083 726/7 |
| 2011/0295707 A1 | 12/2011 | Gui et al. | |
| 2012/0135723 A1* | 5/2012 | Ramo | H04W 4/06 455/418 |
| 2012/0240197 A1* | 9/2012 | Tran | H04L 63/1416 726/4 |
| 2012/0308012 A1* | 12/2012 | Yoon | H04L 9/0847 380/282 |
| 2013/0007442 A1 | 1/2013 | Mao et al. | |
| 2013/0171964 A1* | 7/2013 | Bhatia | H04W 12/08 455/411 |
| 2013/0276079 A1* | 10/2013 | Foulds | H04L 63/08 726/7 |
| 2013/0291071 A1 | 10/2013 | Blom et al. | |
| 2013/0309971 A1* | 11/2013 | Kiukkonen | H04L 63/107 455/41.2 |
| 2013/0315393 A1* | 11/2013 | Wang | H04W 12/04 380/270 |
| 2013/0324114 A1* | 12/2013 | Raghothaman | H04W 8/005 455/426.1 |
| 2014/0006569 A1* | 1/2014 | Ferrazzini | H04L 12/2809 709/220 |
| 2014/0092885 A1* | 4/2014 | Venkatachalam | H04W 8/005 370/338 |
| 2014/0120837 A1* | 5/2014 | Abiri | H04W 16/14 455/41.2 |
| 2014/0133332 A1* | 5/2014 | Lee | H04W 88/04 370/252 |
| 2014/0254499 A1* | 9/2014 | Hassan | H04W 12/08 370/329 |
| 2014/0301552 A1 | 10/2014 | Yi et al. | |
| 2014/0357269 A1* | 12/2014 | Zhou | H04W 8/005 455/434 |
| 2015/0081837 A1* | 3/2015 | Bernier | H04W 8/24 709/217 |
| 2015/0156619 A1* | 6/2015 | Fodor | H04W 8/005 455/434 |
| 2015/0172061 A1* | 6/2015 | Lee | H04W 12/04 713/176 |
| 2015/0180653 A1* | 6/2015 | Nix | H04W 4/70 380/259 |
| 2015/0244876 A1* | 8/2015 | Jabara | H04W 12/06 455/406 |
| 2015/0271675 A1* | 9/2015 | Cheng | H04W 8/005 455/410 |
| 2015/0281953 A1* | 10/2015 | Liu | H04W 76/11 380/283 |
| 2016/0037340 A1* | 2/2016 | Rayment | H04L 63/0853 370/338 |
| 2016/0065362 A1* | 3/2016 | Choyi | H04L 63/065 380/279 |
| 2016/0269903 A1* | 9/2016 | Zhang | H04W 12/04 |
| 2016/0373257 A1* | 12/2016 | Adrangi | H04L 9/14 |
| 2017/0272948 A1* | 9/2017 | Holtmanns | H04B 1/70735 |
| 2017/0372042 A1* | 12/2017 | Isles | H04L 9/083 |
| 2018/0124607 A1* | 5/2018 | Ivory | H04L 67/141 |
| 2019/0090214 A1* | 3/2019 | Sartori | H04W 56/0015 |
| 2019/0165934 A1* | 5/2019 | Zhang | H04W 12/04 |

FOREIGN PATENT DOCUMENTS

| | | |
|---|---|---|
| CN | 101455053 A | 6/2009 |
| CN | 101484889 A | 7/2009 |
| CN | 101800639 A | 8/2010 |
| CN | 103314605 A | 9/2013 |
| WO | 2013/055106 A2 | 4/2013 |
| WO | 2013/118096 A1 | 8/2013 |

* cited by examiner

[Fig. 1a]
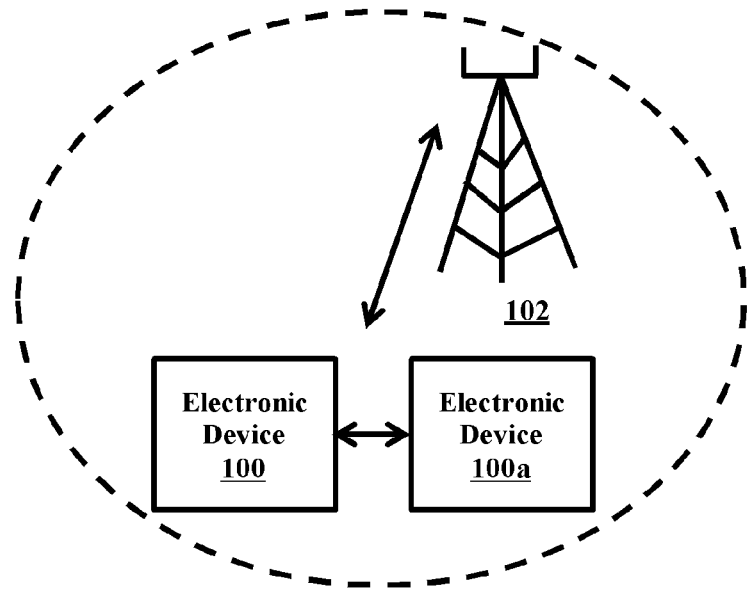
[Fig. 1b]
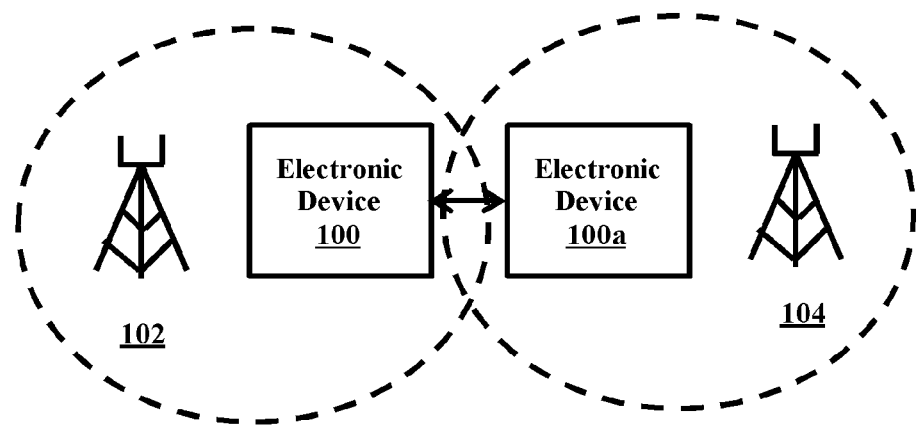
[Fig. 2]
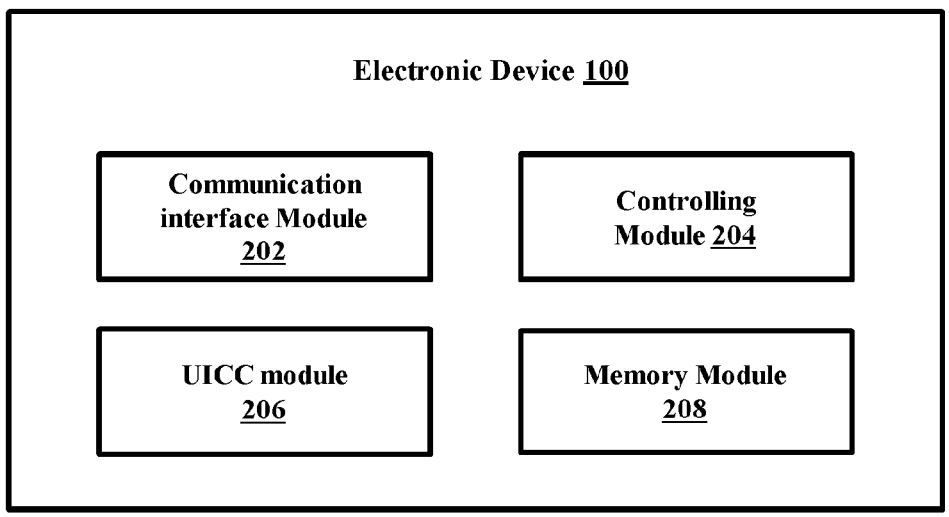

[Fig. 3]
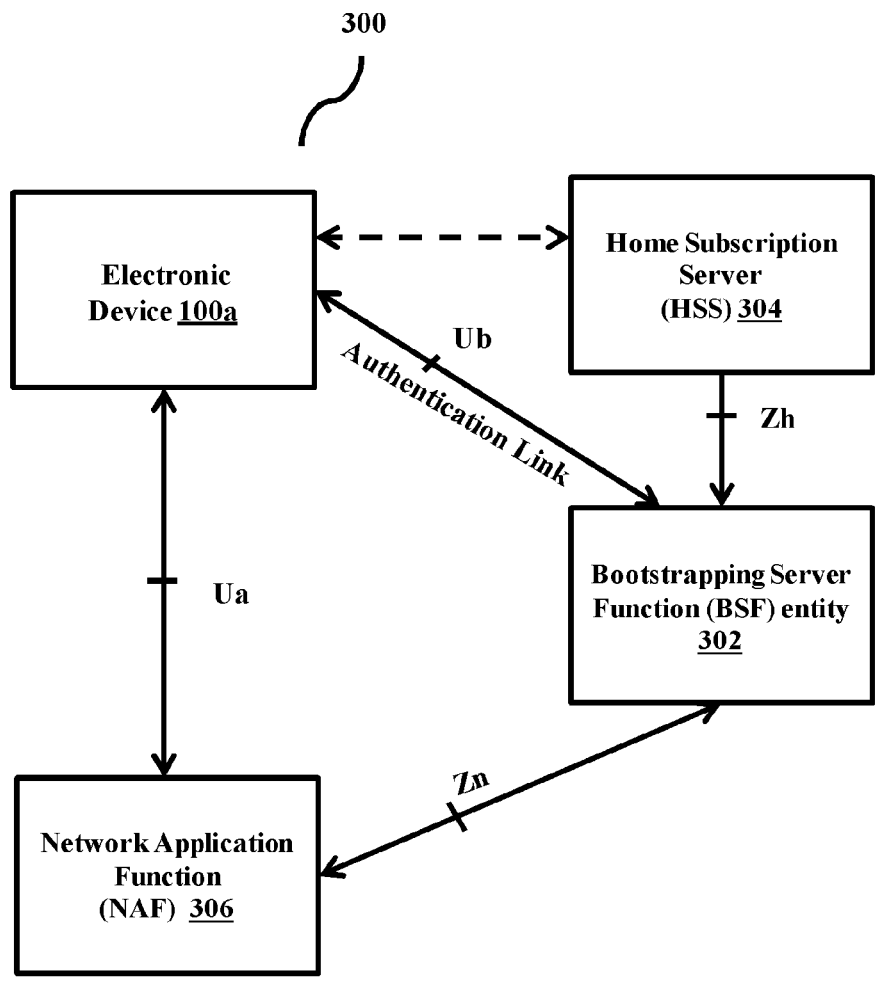
[Fig. 4]
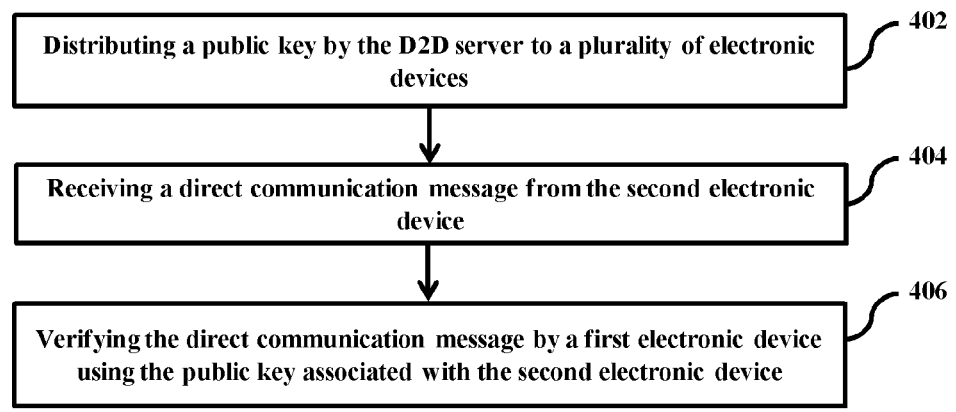

[Fig. 5]
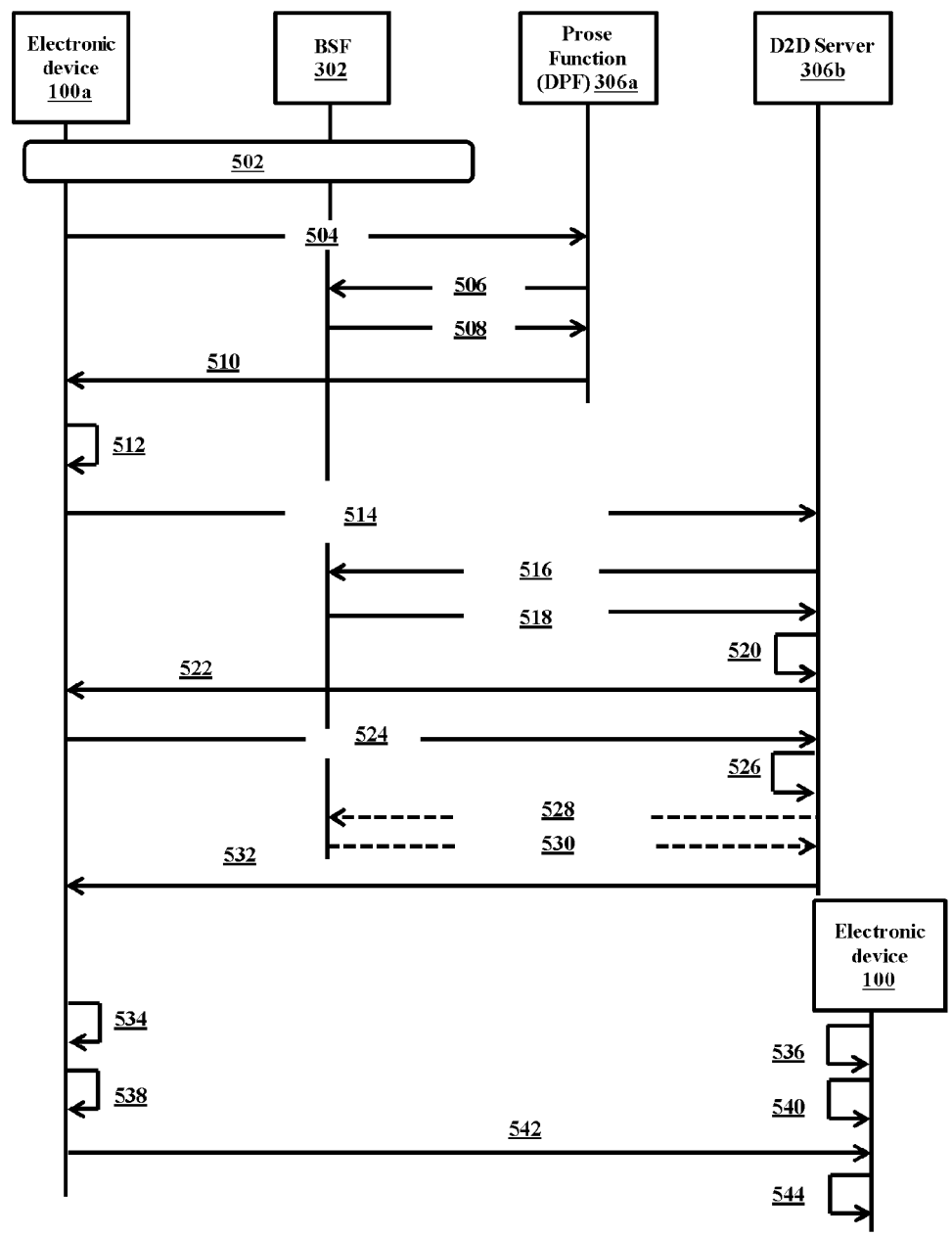

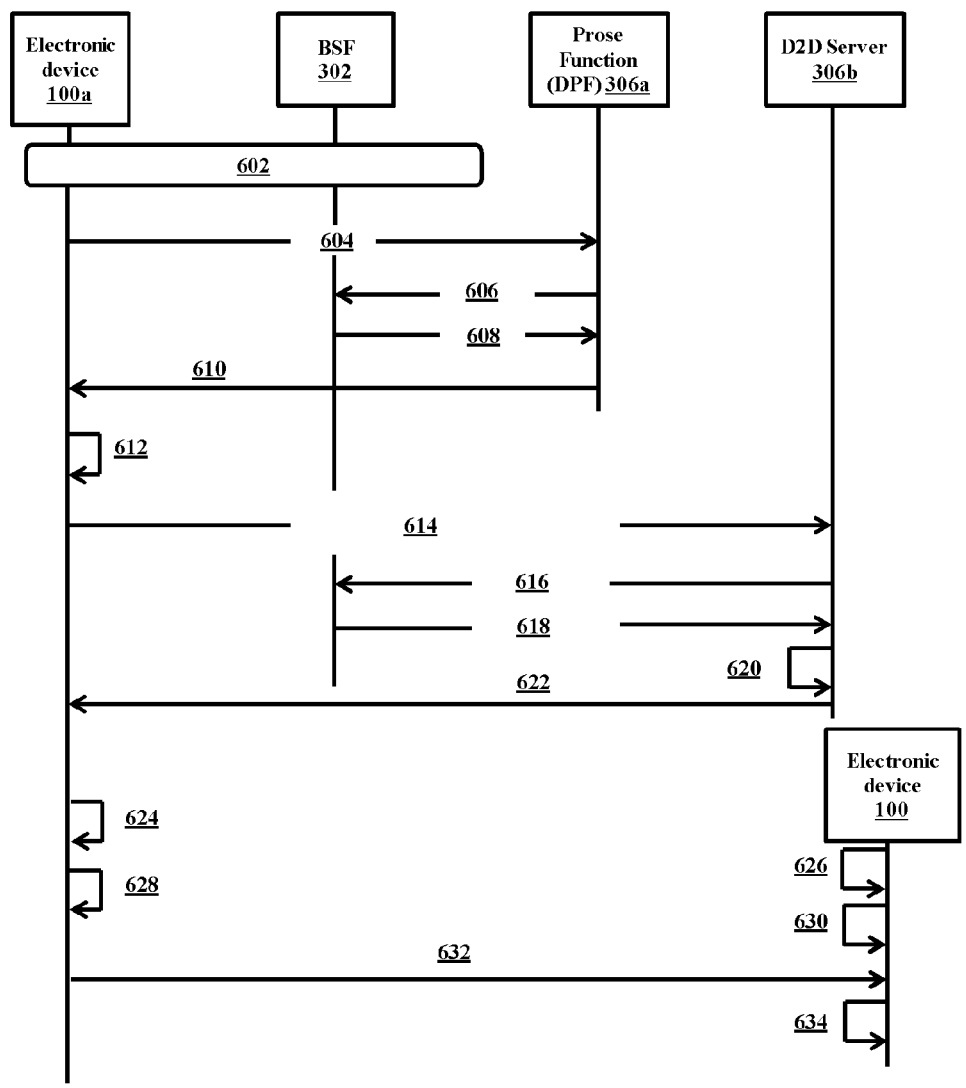
[Fig. 6]

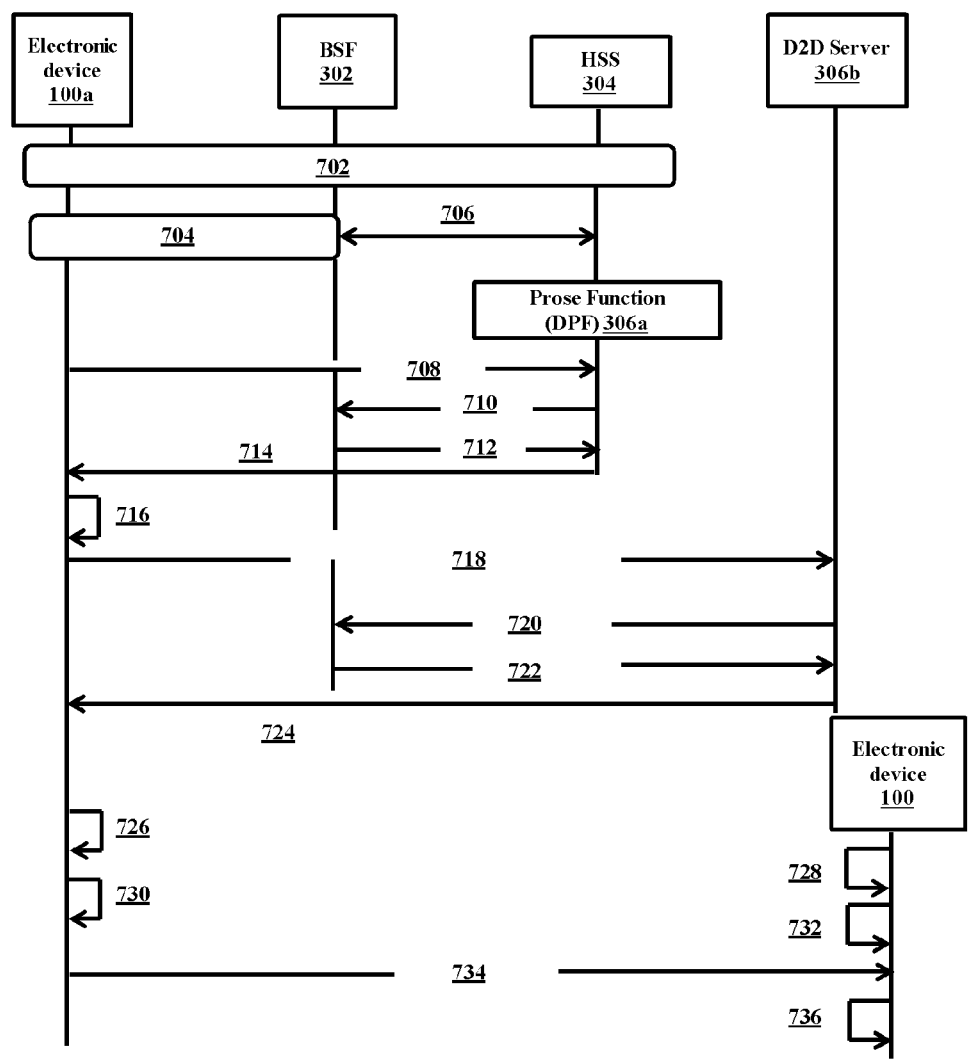
[Fig. 7]

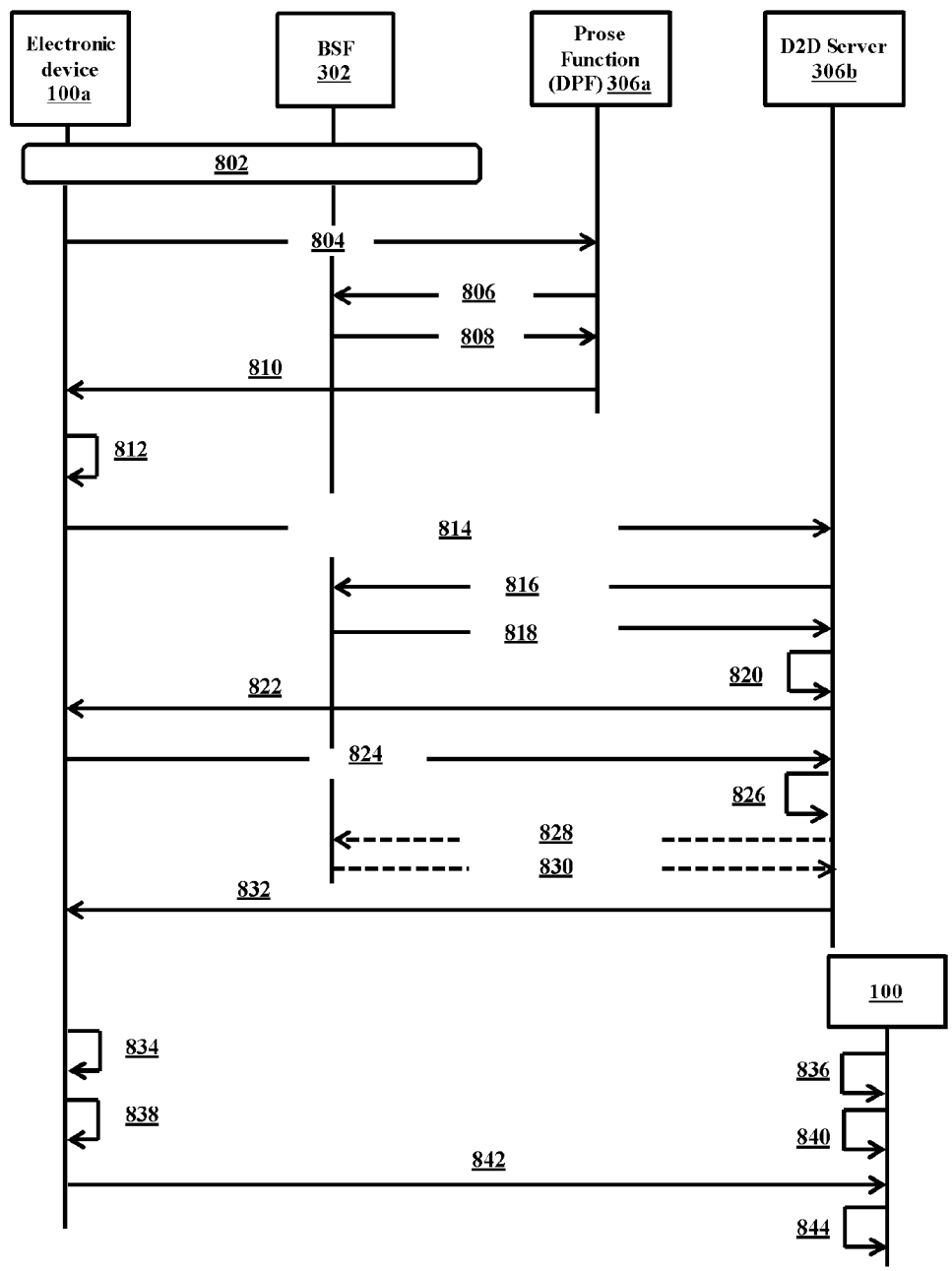
[Fig. 8]

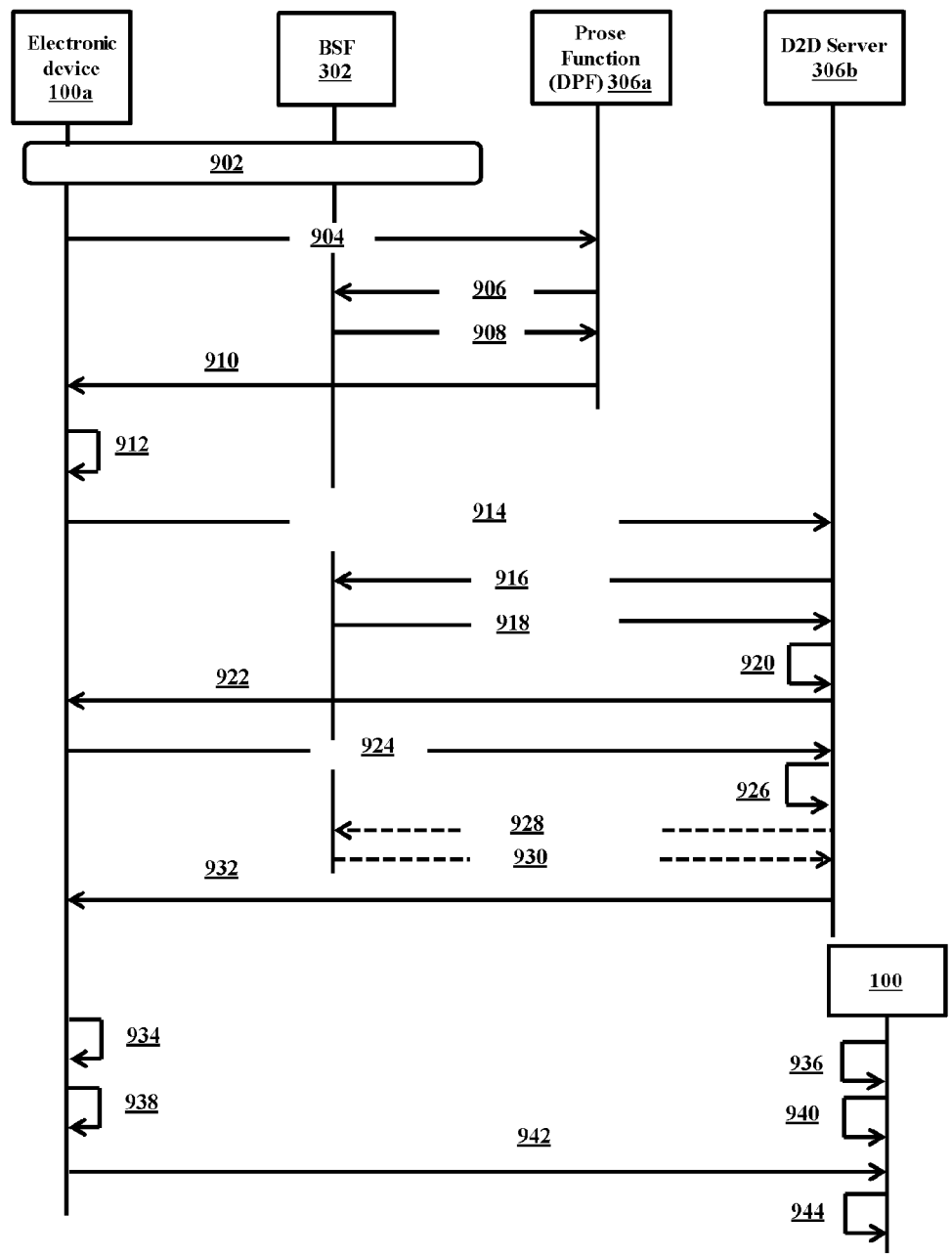
[Fig. 9]

[Fig. 10]
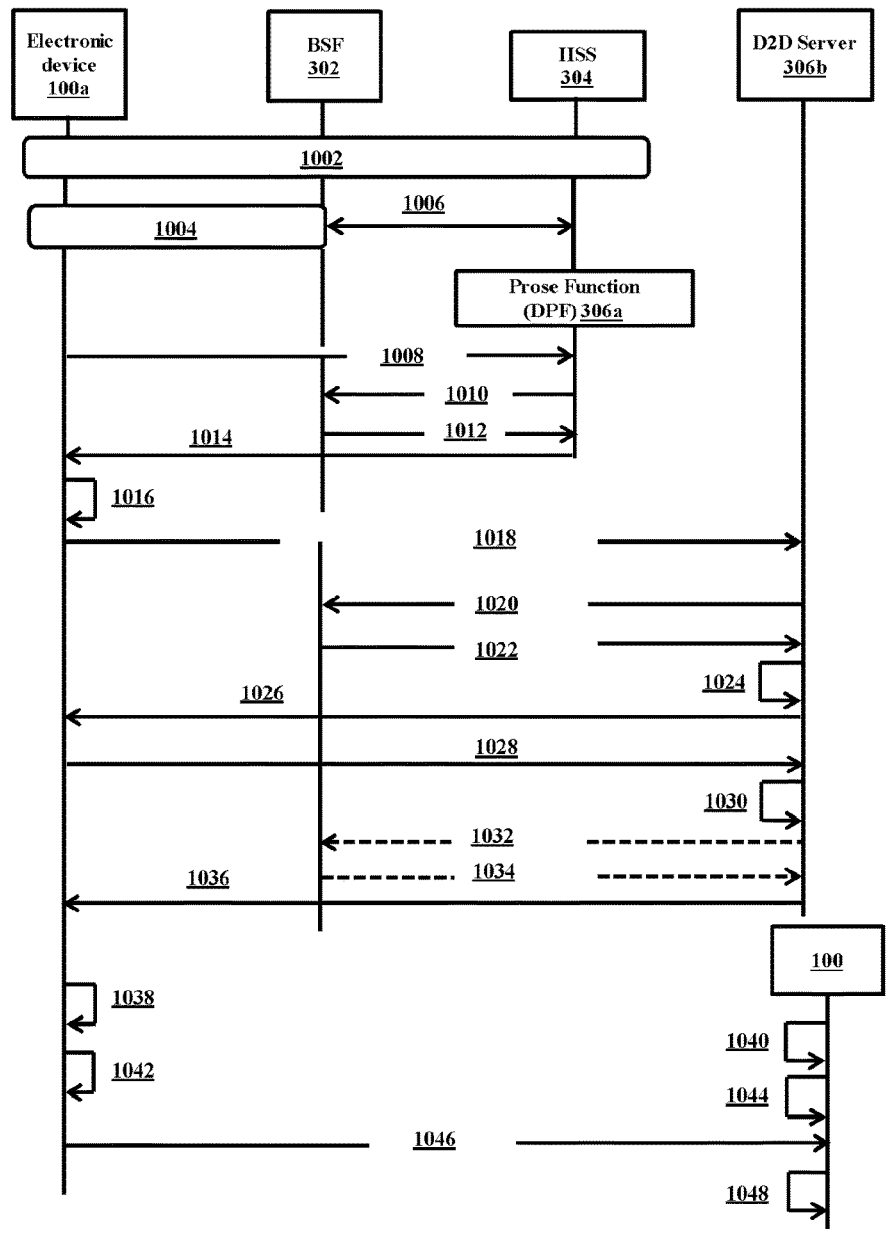
[Fig. 11]
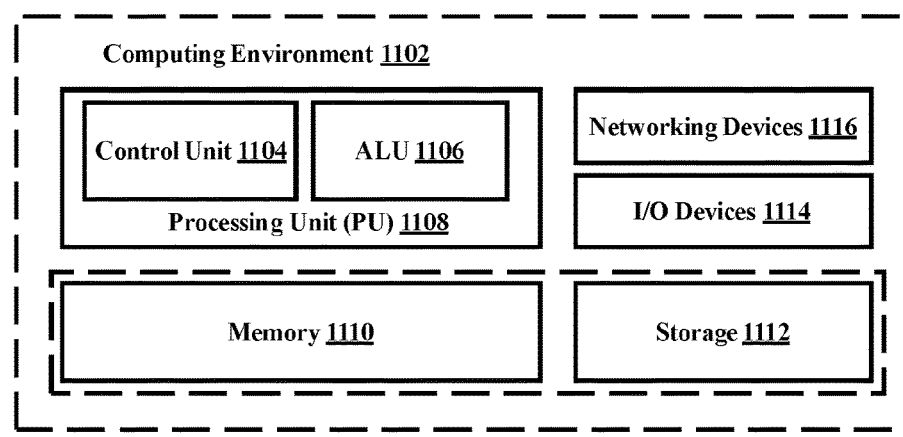

US 10,631,162 B2

METHOD AND APPARATUS TO PERFORM DEVICE TO DEVICE COMMUNICATION IN WIRELESS COMMUNICATION NETWORK

PRIORITY

This application is a National Phase Entry of PCT International Application No. PCT/KR2014/010297, which was filed on Oct. 30, 2014, and claims a priority to Indian Provisional Patent Application No. 4896/CHE/2013, which was filed on Oct. 30, 2013, and claims a priority to Indian Complete Patent Application No. 4896/CHE/2013, which was filed on Oct. 27, 2014 the contents of which are incorporated herein by reference.

TECHNICAL FIELD

The present invention relates to wireless communication networks and more particularly relates to a method and system for verifying identity of a direct communication message using asymmetric keys in a wireless direct communication network.

BACKGROUND ART

Proximity services (ProSe) may support Device-to-Device (D2D) communication in a cellular technology ecosystem. ProSe may rely on the proximity between two or more electronic devices, (for example, User Equipment (UEs) or Mobile Stations (MSs)), and allow specific commercial and social applications, network offloading, or public safety direct communications. Other alternatives, such as Wi-Fi or Bluetooth, may also support D2D communication, but they may operate on a license-exempt band (unlicensed spectrum), and thus they may be subject to higher interference and lower quality of service (QoS). ProSe may use D2D discovery and various communication procedures to address these issues.

Third Generation Partnership Project (3GPP) is currently focusing on a UE's ability to discover other UEs in its vicinity by using direct UE-to-UE signaling with E-UTRA. Further, the 3GPP is considering procedure for discovery, signaling between involved UEs, criteria to determine proximity, support of discovery of UEs subscribed to different operators and direct user plane packets communication. The D2D communication enables an electronic device to directly discover, communicate and exchange data with a neighboring electronic device without the help of a cellular network, and each electronic device for the D2D communication broadcasts the electronic devices own information in order to inform other electronic devices of information on itself. In case of open discovery, there is no explicit permission that is needed from the UE being discovered and restricted discovery needs an explicit permission from the UE that is being discovered. There are two possible D2D discovery enablers: direct communication and standalone services. When the UE receives a discovery message (a direct communication message), there is need for authenticity verification of the direct communication message. The authenticity verification of the direct communication message is needed so as to confirm the information provided in the direct communication message is from an authenticated UE.

Further, it is necessary to ensure that no malicious UE is impersonating the actions of another genuine UE. Authenticity verification is recommended for both open and restricted discovery. For standalone service case, the authentic verification to be completed without any further message exchange with the UE to be discovered. For direct communication, it is possible to verify the authenticity, by running authentication procedure as subsequent messages exchanges are possible.

DISCLOSURE

Technical Problem

The principal object of the embodiments herein is to provide a method and system for verifying identity of a direct communication message by the receiving electronic devices using asymmetric keys in a wireless direct communication network.

Another object of the invention is to provide a method to identity authenticity verification when electronic devices communicate directly with each other in a network coverage area or when the electronic devices are out of the coverage area.

Another object of the invention is to provide a method for securing the direct communication message by an electronic device and the wireless direct communication network by deriving a digital signature.

Technical Solution

Accordingly the invention provides a method for verifying identity of a direct communication message using asymmetric keys in a wireless direct communication network comprising a plurality of electronic devices, wherein the method comprises distributing by a Device-to-Device (D2D) server a public key associated with a second electronic device distributed among the plurality of electronic devices. Further, the method comprises receiving at a first electronic device the direct communication message from the second electronic device, wherein the direct communication message comprises a digital signature generated using a private key associated with the second electronic device by the second electronic device. Furthermore, the method comprises verifying at the first electronic device the identity of the direct communication message using the public key associated with the second electronic device.

Accordingly the invention provides a method for verifying identity of a direct communication message using asymmetric keys in a wireless direct communication network comprising a plurality of electronic devices, wherein the method comprises obtaining a private key associated with a first electronic device by registering for D2D services with the wireless direct communication network at the first electronic device. The method comprises sending the direct communication message including digital signature using the private key by the first electronic device to a second electronic device. Further, the method comprises verifying the identity of the direct communication message by verifying the digital signature included in the direct communication message using the identity of the first electronic device as the public key at the second electronic device.

Accordingly the invention provides a User Equipment (UE) for verifying identity of a direct communication message using asymmetric keys in a wireless direct communication network, wherein the UE is configured to receive the direct communication message from another UE, wherein the direct communication message comprises a digital signature generated using a private key associated with another UE. Further, the UE is configured to verify the identity of the direct communication message by verifying the digital signature included in the direct communication message using the public key associated with another UE.

Accordingly the invention provides a User Equipment (UE) for verifying identity of a direct communication message using asymmetric keys in a wireless direct communication network comprising a plurality of electronic devices, wherein the UE is configured to receive the direct communication message including digital signature using a private key from another UE. Further, the UE is configured to verify the identity of the direct communication message by verifying the digital signature included in the direct communication message using an identity of another UE as public key.

Accordingly the invention provides a wireless direct communication network for receiving a public key of a User Equipment (UE), the wireless direct communication network comprises a Bootstrapping server Function (BSF) entity, a Direct Provisioning Function (DPF) entity, a Home Subscription Server (HSS) and a Device to Device (D2D) server, wherein the D2D server is configured to distribute the public key associated with the UE among the plurality UEs.

Accordingly the invention provides a method for verifying identity of a direct communication message using asymmetric keys in a wireless direct communication network comprising a plurality of electronic devices, wherein the method comprises distributing by a primary network node a public key associated with a second electronic device distributed among the plurality of electronic devices. Further, the method comprises receiving at a first electronic device the direct communication message from the second electronic device, wherein the direct communication message comprises a digital signature generated using a private key associated with the second electronic device. Furthermore, the method comprises verifying at the first electronic device the identity of the direct communication message using the public key associated with the second electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIGS. 1A and 1B illustrate electronic devices communicating securely in a wireless direct communication network, according to embodiments as disclosed herein;

FIG. 2 illustrates a block diagram of an electronic device with various modules, according to the embodiments as disclosed herein;

FIG. 3 illustrates a network architecture with various network elements for verifying identity of a direct communication message using asymmetric keys in the wireless direct communication network, according to the embodiments as disclosed herein;

FIG. 4 is a flow diagram explaining a method for verifying identity of a direct communication message using asymmetric keys in a wireless direct communication network, according to the embodiments as disclosed herein;

FIG. 5 illustrates a sequence diagram in which the electronic device sends a public key to a Bootstrapping Server Function (BSF) entity, according to the embodiments as disclosed herein;

FIG. 6 illustrates a sequence diagram in which the electronic device sends the public key to a D2D server, according to the embodiments as disclosed herein;

FIG. 7 illustrates a sequence diagram in which the electronic device sends the public key to a Home subscription server (HSS), according to the embodiments as disclosed herein;

FIG. 8 illustrates a sequence diagram in which the electronic device sends the public key to the BSF entity and the BSF entity shares the public key with the D2D server, according to the embodiments as disclosed herein;

FIG. 9 illustrates a sequence diagram in which the electronic device sends the public key to the D2D server in a register key message, according to the embodiments as disclosed herein;

FIG. 10 illustrates a sequence diagram in which the electronic device sends the public key to the HSS and the D2D server obtains the public key from the BSF entity, according to the embodiments as disclosed herein; and FIG. 11 illustrates a computing environment implementing the method to identity verification of the direct communication message using asymmetric keys in the wireless direct communication network, according to the embodiments as disclosed herein.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method to verify identity of a direct communication message using asymmetric keys in a wireless direct communication network comprising a plurality of electronic devices is provided. The method includes distributing a public key associated with a second electronic device among a plurality of electronic devices by a Device-to-Device (D2D) server. The method includes distributing the private key associated with second electronic device to the second electronic device. The method includes receiving a direct communication (e.g. discovery announcement) message from the second electronic device at a first electronic device. The direct communication message comprises a digital signature generated using a private key associated with the second electronic device.

Further, the method includes verifying the identity of the direct communication message using the public key associated with the second electronic device at the first electronic device.

Unlike the conventional method, the proposed method provides the usage of public key cryptography to identity authenticity verification in D2D communication that can mitigate the risk during the D2D communication. The disclosed method provides the mechanism for identity authenticity verification when the electronic devices communicate directly with each other in a network coverage area or when the electronic devices are out of the coverage area of the network.

Further, the disclosed method provides a mechanism for securing direct communication message by the electronic device and the wireless direct communication network by deriving the digital signature using one or more network controlled parameters with time stamp and the public key of the electronic device.

The electronic device can be a User Equipment (UE). The method for verifying identity of the direct communication message using asymmetric keys in a wireless direct communication network can be applicable for various electronic devices including the UE. The public key of the electronic device and other keys associated with the various Network Application Functions (such as D2D server, Direct Provisioning Function (DPF) entity and so on) are provided in the description with respect to the UE. It can be understood that the public key can be associated with the electronic device (in a general scenario) even through it is not explicitly mentioned throughout the description.

Throughout the description, the terms D2D communication, Prose communication, direct communication and P2P communication will have the same meaning.

Throughout the description, the term direct communication message refers to a discovery announcement message or a unicast/group cast/broadcast communication packet carrying Internet Protocol (IP) or other upper layer user information or a unicast/group cast/broadcast communication packet carrying control signaling or a unicast/group cast/broadcast user plane packet.

Further, the D2D server can be a primary network node, a Bootstrapping server Function (BSF) entity can be a first network node, a DPF entity is a second network node and a Home Subscription Server (HSS) is a third network node in the wireless communication network according to the below description.

The terms "Direct Provisioning Function (DPF)", "ProSe Function", "D2D Server", "ProSe Server", "Key Management System (KMS)" and "Direct Discovery Name Management Function" are used interchangeably.

Referring now to the drawings and more particularly to FIGS. 1 through 11 where similar reference characters denote corresponding features consistently throughout the figures, there are shown preferred embodiments.

FIGS. 1A and 1B illustrate electronic devices communicating securely in a wireless direct communication network, according to embodiments as disclosed herein. As depicted in the FIG. 1A, the electronic devices 100 and 100a are connected to a network node 102, for example, a base station. The electronic device 100 or electronic device 100a can be a mobile phone, a smart phone, Personal Digital Assistants (PDAs), a tablet and the like.

The electronic device 100 is in proximity to the electronic device 100a where both the devices are in a radio coverage area of the network node 102 as shown in the FIG. 1A.

The electronic device 100 is in the radio coverage area of the network node 102 and the electronic device 100 is in proximity to the electronic device 100a in a radio coverage area of a Network node 104 as shown in the FIG. 1B. In an embodiment, the electronic device 100 is in proximity to the electronic device 100a where both the devices are not in a radio coverage area of the any network node (out-of-coverage). In an embodiment, the electronic device 100 is in proximity to the electronic device 100a where one of the device is in a radio coverage area of the any network node and other device is not in coverage of any network node.

In an embodiment, the electronic device 100a sends the public key to the D2D server may be through various network elements (not shown in the figure and is explained in the later parts of the description). The D2D server distributes the public key of the electronic device among the plurality of electronic devices interested in D2D services.

In an embodiment, the electronic device 100 registers for D2D services with the wireless communication network (e.g. ProSe Function) and obtains the public key of the electronic device 100a. The electronic device 100a broadcasts an direct communication message with a digital signature using a private key. The private key may be obtained by the obtained by the electronic device 100a from the D2D server or may generate itself or may obtain the same from a designated network entity. When the electronic device 100 receives the direct communication message from the electronic device 100a, the electronic device 100 verifies the identity of the direct communication message using the public key of the electronic device 100a.

In an embodiment, if Identity-based cryptography is used, then the electronic device 100a registers for D2D services with the wireless communication network (ProSe Function) and obtains private key (key material associated with its identity). The electronic device 100a may sign the direct communication message using the private key associated with it (the identity of the electronic device 100a). The electronic device 100 monitors for the direct communication message in its proximity. When the electronic device 100 receives the direct communication message from the electronic device 100a, the electronic device 100 verifies the identity of the direct communication message (origin of the message) using the identity of the electronic device 100a. In an embodiment, if the electronic device 100a sends the direct communication message to communication message to the electronic device 100, then electronic device 100a encrypts the message using the identity of the electronic device 100. When the electronic device 100 receives the encrypted message from the electronic device 100a, the electronic device 100 decrypts the message using the private key associated with it.

Throughout the description, the terms first electronic device 100 and the electronic device 100 are used interchangeably.

Throughout the description, the terms second electronic device 100a and the electronic device 100a are used interchangeably.

FIG. 2 illustrates a block diagram of an electronic device with various modules, according to the embodiments as disclosed herein. The electronic device 100 includes a communication interface module 202, a controlling module 204, a Universal Integrated Circuit Card (UICC) module 206 and a memory module 208. The communication interface module 202 helps the UE 100 to connect to the wireless direct communication network that may include but not limited to a plurality of eNBs.

In an embodiment, the method allows the controlling module 204 to perform one or more actions for verifying the identity of the direct communication message using the asymmetric keys. The method allows the controlling module 204 to generate the direct communication message. The direct communication message comprises a digital signature generated using a private key and/or encrypted using a private key associated with the electronic device 100a. The method 400 allows the controlling module 204 to verify and/or decrypt the direct communication message using the public key associated with the second electronic device 100a. In an embodiment, the public key being the identity of the electronic device or identity of the user of electronic device or identity of the user specific to application running on the electronic device.

The UICC module 206 enables the communication between the electronic device 100 and the wireless communication network through the communication interface module 202. The UICC module 206 is a smart card on the electronic device 100 which is referred as a Subscriber Identity Module (SIM) in second Generation (2G) context and also referred as Universal SIM (USIM) in third Generation (3G) context. The UICC module 206 includes a memory that may store information and instructions. In an embodiment, the UICC module 206 generates GBA specific key, Ks. The electronic module uses the shared key, Ks to generate a shared secret key, which is used to ensure security on the Ua interface, thus enabling a secure channel between the electronic device 100 and a Network Application Function (NAF).

The memory module 208 may include a random access memory (RAM) or another type of storage device such as a flash memory that may store information and instructions, for example an application, for execution by processor, a read-only memory (ROM) device or another type of static storage device. The memory module 208 stores the public key distributed by the D2D server. In an embodiment, the public key is obtained from the memory module 208 for verifying the identity of the direct communication message from the electronic device 100a.

FIG. 3 illustrates network architecture with various network elements for verifying identity of a direct communication message using asymmetric keys in the wireless communication network (direct communication), according to the embodiments as disclosed herein. The network architecture 100 includes the electronic device 100a, a bootstrapping server function (BSF) entity 302, a Home Subscription Server (HSS) 304 and at least one NAF 306. The HSS 304 and the BSF entity 302 may be hosted in one or more network devices and/or servers that are part of the infrastructure of the network architecture 100. The NAF 306 includes a Direct Provisioning Function (DPF) entity 306a and a D2D server 306b (not shown in the figure). In an embodiment, the DPF entity 306a and the D2D server 306b may be co-located as a single entity.

The HSS 304 interfaces with the BSF entity 302 through Zh interface as shown in FIG. 3. The HSS 304 includes a database that contains mobile subscriber information, including an International Mobile Subscriber Identity (IMSI) for each electronic device 100a belonging to the subscriber. The IMSI is a unique number that is associated with the electronic device 100a in the wireless communication network. The IMSI is also stored in the UICC module of each electronic device 100a.

The BSF entity 302 is communicatively coupled to the electronic device 100a through the Ub interface. This interface may be a wired or wireless interface. The Ub interface is defined by the 3GPP Generic Bootstrapping Architecture (GBA) specification. The BSF entity 302 and the electronic device 100a run the 3GPP GBA protocol to generate a shared key, Ks. The electronic device 100a uses the shared key, Ks to generate a shared secret key, which is used to ensure security on the Ua interface, thus enabling a secure interface between the electronic device 100a and the NAF 306.

The BSF entity 302 interfaces with the NAF 306 or with a trusted application running on the NAF 306 through the Zn interface. The Zn interface is typically an operator-specific or proprietary protocol. The Zn interface may allow a generic NAF, such as a trusted application running on the electronic device 100a, to fetch the key agreed by the BSF entity 302 during a previous GBA protocol transfer over the Ub interface between the BSF entity 302 and the electronic device 100a. Thus, the NAF 306 receives the shared secret key, from the BSF entity 302 over the Zn interface.

In an embodiment, the BSF entity 302 is configured to receive the public key from the electronic device 100a or any other possible network entity (for example, Key Management System (KMS)). The BSF entity 302 obtains a key request from a DPF entity 306 with a Bootstrapping Transaction Identifier (B-TID) and sends the public key to DPF entity 306 in response to the key request from the DPF entity 306.

Further, the BSF entity 302 is configured to obtain a key request from the D2D server 306b with the B-TID. The BSF entity 302 sends the public key to the D2D server 306b in response to receiving the key request from the D2D server 306b.

In an embodiment, the HSS 304 is configured to receive the public key from the electronic device 100a. Further, the HSS 304 sends the public key to the BSF entity 302 through a Generic Bootstrapping Architecture (GBA) User Security Settings (GUSS). The GUSS is stored in the HSS 304. In an embodiment, the DPF entity 306a is configured to receive the public key from the electronic device 100a or any other possible network entity (for example KMS) directly. The DPF entity 306a obtains a key request from the electronic device 100 (not shown in FIG. 3) and sends the public key to the electronic device 100 in response to the key request from the electronic device 100, if it is authorized for receiving the direct communication message from the electronic device 100a. Asymmetric security keys can provide protection against impersonation by monitoring ProSe electronic device 100, especially for one to many communication scenarios. Public Key of the ProSe electronic device 100a or ProSe application in the ProSe electronic device 100a is provided to ProSe server securely and ProSe server distributes the Public Key to the authorized ProSe electronic devices for direct communication message verification (e.g. discovery information verification in case of D2D discovery service). In case of D2D discovery service, once the Prose electronic device 100a gets authorized and configured for ProSe discovery, then the ProSe electronic device 100a starts sending its announcement for other electronic devices to discover it. The direct communication message is digitally signed using its private key and the direct communication message carries the digital signature. When this direct communication message is received by other prose electronic devices which are in interest to communicate with this electronic device 100a, would have obtained public key of this electronic device 100a from the D2D Server. So the monitoring ProSe electronic devices verify the authenticity of the direct communication message.

FIG. 4 is a flow diagram explaining a method 400 for verifying identity of the direct communication message using asymmetric keys in a wireless communication network, according to the embodiments as disclosed herein. In an embodiment, at step 402, the method 400 includes distributing a public key to a plurality of electronic devices by the D2D server 306b. In an embodiment, the method 400 allows the D2D server 306b to obtain the public key from various network elements or from the electronic device directly and the method 400 allows the D2D server 306b to distribute the public key among the plurality of electronic devices.

In an embodiment, the D2D server 306b sends a key request message with a Bootstrapping Transaction Identifier (B-TID) and a D2D server ID to the BSF entity 302. The B-TID is received from the electronic device 100a by the D2D server 306b. The BSF entity 302 sends the public key of the second electronic device 100a and the D2D server specific key (in association with the electronic device 100a) in a key response message to the D2D server.

In an embodiment, the D2D server 306b obtains the public key of the second electronic device 100a in a message from the second electronic device 100a. The message from electronic device 100a to the D2D server 306b may comprises one or more of the B-TID, MAC, D2D server ID along with the public key of the second electronic device 100a. In an embodiment, the message can be a PC3 interface (defined in TS 23.303) specific protocol message. For example, in case of D2D discovery service this message is the Get Expression code request message. In an embodiment, the D2D server 306b obtains the public key of the second electronic device 100a in a register key message from the second electronic device 100a. The register key message comprises the B-TID, MAC, D2D server ID along with the public key of the second electronic device 100a. Further, the D2D server obtains the D2D server specific key in a key response message from the BSF entity 102.

At step 402, the D2D server 306b provides the public key of the second electronic device 100a to the first electronic device 100 in response to the request message from the first electronic device 100. In an embodiment, the request message can be a PC3 interface (defined in TS 23.303) specific protocol message. For example, in case of D2D discovery service this message is the Get Expression code request message. In an embodiment, request message can be a key request message. In an embodiment, request message can be a service authorization message.

In an embodiment at step 402, the D2D server 306b also provides the private key of the second electronic device 100a in a PC3 interface (defined in TS 23.303) specific protocol message to the second electronic device 100a. In an embodiment, the D2D server 306b may obtain the private key associated with the electronic device 100a from other possible network entities.

At step 404, the method 400 includes receiving the direct communication message from the second electronic device 100a. The direct communication message comprises a digital signature generated using a private key associated with the second electronic device. In an embodiment, the direct communication message may also be encrypted using a private key associated with the second electronic device. In an embodiment, the direct communication message is broadcasted or group casted or unicasted by the second electronic device 100a. The electronic devices in the proximity or vicinity of the second electronic device 100a receive the direct communication message from the second electronic device 100a.

At step 406, the method includes verifying the direct communication message by a first electronic device using the public key associated with the second electronic device 100a.

Further, the various actions, units, steps, blocks, or acts described in the method 400 can be performed in the order presented, in a different order, simultaneously, or a combination thereof. Furthermore, in some embodiments, some of the actions, units, steps, blocks, or acts listed in the FIG. 4 may be omitted.

FIG. 5 illustrates a sequence diagram in which the electronic device sends a public key to a Bootstrapping Server Function (BSF) entity, according to the embodiments as disclosed herein. A GBA bootstrapping procedure is performed between the electronic device 100a and the BSF entity 302. The GBA procedure results in the electronic device 100a device and the BSF entity 302 each establishing a corresponding D2D shared key ($K_{s\_UEa}$).

Initially, the electronic device 100a sends in operation 502 the public key ($K_{UEa\_publickey}$) to the BSF entity 302. In an embodiment, the electronic device 100a sends the list of network entity IDs authorized to obtain the public key.

In an embodiment, the electronic device 100 sends its public key ($K_{UEa\_PublicKey}$) to the BSF entity 302 using the Ub interface for storing and forwarding it to the NAF 306 (which includes D2D server 306b and other electronic devices) as shown in FIG. 2.

In an embodiment, if the $K_{UEa\_PublicKey}$ is device specific key, then the electronic device 100a sends only device specific key to BSF entity 302. In an embodiment, if the $K_{UEa\_PublicKey}$ is application specific key, then the electronic device 100a sends all the D2D application specific keys to the BSF entity 302.

In an embodiment, the electronic device 100a possesses device specific and application specific public keys to the BSF entity 302.

The reference point Ub is between the electronic device 100a and the BSF entity 302. The reference point Ub provides mutual authentication between the electronic device 100a and the BSF entity 302. The Ub allows the electronic device 100a to bootstrap the session keys based on 3GPP Authentication and Key Agreement (AKA) protocol. The HTTP Digest AKA protocol, which is specified in RFC 3310, is used on the reference point Ub.

In an embodiment, the electronic device 100a sends its public key as an attribute along with the "Request Authorization: Digest" message as shown below.

Request containing credentials
REGISTER sip:home.mobile.biz SIP/2.0
Authorization: Digest
    username="jon.dough@mobile.biz",
    realm="RoamingUsers@mobile.biz",
    nonce="CjPk9mRqNuT25eRkajM09uTl9nM09uTl9n Mz5OX25PZz==",
    uri="sip:home.mobile.biz",
    qop=auth,
    nc=00000001,
    cnonce="0a4f113b",
    response="4429ffe49393c02397450934607c4ef1",
    opaque="5ccc069c403ebaf9f0171e9517f40e41",
    ClientData="5PYxMuX2NOT2NeQ=" ($K_{UEa\_PublicKey}$)

*86 In an embodiment, the electronic device 100a sends its public key in a separate HTTP digest AKA protocol message.

The BSF entity 302 stores the public key along with the $K_{s\_UEa}$ and sends the one or more public key ($K_{UEa\_PublicKey}$) along with the D2D server specific key ($K_{DPF\_entity\_UEa}/K_{D2DSer\_UEa}$) when requested by D2D network entities (NAFs).

The electronic device 100a sends in operation 504 the D2D direct configuration or registration request with the B-TID to a Direct Provisioning Function (DPF) entity 306a. Further, the DPF entity 306b sends in operation 506 a key request message with the B-TID and a DPF entity ID to the BSF entity 302. The BSF entity 302 receives the key request from the DPF entity 306a and sends in operation 508 a key response message with a D2D network specific entity key ($K_{DPF\ entity\_UEa}$) and one or more public key ($K_{UEa\_publickey}$) of the electronic device 100a to the DPF entity 306b. The Keys ($K_{DPF\ entity\_UEa}/K_{ProSeSer\_UEa}$) are derived as specified in 3GPP TS 33.220 specification.

The DPF entity 306a sends in operation 510 the D2D direct configuration registration response to the electronic device 100a. In an embodiment, the configuration is protected with ($K_{DPF\ entity\_UEa}$). In an embodiment, the configuration registration message includes the private key associated with the electronic device ID 100a, if Identity based asymmetric cryptography is used. The electronic device 100a uses the received private key for generating the signature or to decrypt the message received from other electronic devices.

The electronic device 100a receives the configuration from the DPF entity 306a, derives in operation 512 the $K_{DPF\ entity\_UEa}$ and verifies the configuration obtained from the DPF entity 306a.

The electronic device 100a sends in operation 514 the Get expression code request along with the B-TID for requesting an own code to the D2D server 306b. The D2D server obtains the Get expression code request from the electronic device 100a and sends in operation 516 a key request with B-TID and the D2D server ID to the BSF entity 302.

The BSF entity 302 sends in operation 518 the key response with D2D network specific entity key ($K_{D2Dser\_UEa}$) along with the public key to the D2D server. Further, the D2D server 306b generates in operation 520 an expression code for the electronic device 100a and stores mapping of the electronic device 100a's expression code and B-TID and/or the public key ($K_{UEa\_publickey}$).

The D2D server 306b sends in operation 522 the expression code response message to the electronic device 100a. In an embodiment, the expression code response message is protected by the network specific entity key ($K_{D2Dser\_UEa}$). The expression code response message from the D2D server includes the expression code of the electronic device 100a.

The electronic device 100a sends in operation 524 the get expression code request message to the D2D server 306b with the B-TID for requesting the expression code of the other electronic devices. The D2D server 306b retrieves in operation 526 the expression code of other electronic devices or UEs and the corresponding public keys of the other electronic devices form a mapping table. In an embodiment, when the public key of other electronic device is unavailable in the D2D server 306b, then the D2D server 306b sends in operation 528 the key request to the BSF entity 302 with the B-TID (of the other electronic device) requesting for the public key of the other electronic device. The BSF entity 302 sends in operation 530 the public key of the other electronic device in a key response message to the D2D server 306b.

Further, the D2D server 306b sends in operation 532 the expression code response message that includes relevant expression codes of other electronic devices along with the public keys of the other electronic devices to the electronic device 100a.

The electronic device 100a receives the expression code response from the D2D server 306b and derives in operation 534 the network specific entity key ($K_{D2Dser\_UEa}$). Further, the electronic device 100a stores the corresponding codes and the public key of the other electronic devices.

The electronic device 100 registers in operation 536 for D2D service and obtains the expression code along with the Public key ($K_{UEa\_Publickey}$) from the D2D server. The electronic device 100a broadcasts in operation 538 the direct communication message to the electronic device 100 as shown in FIG. 5.

The electronic device 100 monitors in operation 540 for the direct communication message from the electronic device 100a. In an embodiment, the electronic device 100a sends in operation 542 the D2D direct communication message with a digital signature to the electronic device 100. The electronic device 100 verifies in operation 544 the direct communication message using the public key ($K_{UEa\_publickey}$) of the electronic device 100a. In an embodiment, the public key ($K_{UEa\_publickey}$) can be the identity of the announcing electronic device 100a.

FIG. 6 illustrates a sequence diagram in which the electronic device sends the public key to a D2D server, according to the embodiments as disclosed herein. As depicted in the sequence diagram the BSF entity 302 authenticates in operation 602 the electronic device 100a using GBA authentication procedure. The BSF entity 302 and the electronic device 100a obtains the B-TID and the corresponding D2D shared key ($K_{s\_UEa}$) as a result of GBA authentication procedure.

The second electronic device 100a sends in operation 604 the D2D direct configuration or registration request with the B-TID to a Direct Provisioning Function (DPF) entity 306a. Further, the DPF entity 306b sends in operation 606 a key request message with the B-TID and a DPF entity ID to the BSF entity 302. The BSF entity 302 receives the key request from the DPF entity 306a and sends in operation 608 a key response message with a D2D network specific entity key ($K_{DPF\ entity\_UEa}$) and to the DPF entity 306b.

The DPF entity 306a sends in operation 610 the D2D direct configuration registration response to the electronic device 100a. In an embodiment, the configuration is protected with ($K_{DPF\ entity\_UEa}$).

The electronic device 100a receives the configuration from the DPF entity 306a, derives in operation 612 the $K_{DPF\ entity\_UEa}$ and verifies the configuration obtained from the DPF entity 306a.

The electronic device 100a sends in operation 614 the Get expression code request along with the B-TID for requesting an own code to the D2D server 306b. The D2D server obtains the Get expression code request from the electronic device 100a and sends in operation 616 a key request with B-TID and the D2D server ID to the BSF entity 302.

The BSF entity 302 sends in operation 618 the key response with D2D network specific entity key ($K_{D2Dser\_UEa}$) to the D2D server. The D2D server verifies in operation 620 the D2D network specific entity key ($K_{D2Dser\_UEa}$).

Further, the D2D server 306b sends in operation 622 the expression code response message that includes relevant expression codes of other electronic devices along with the public keys of the other electronic devices to the electronic device 100a.

The electronic device 100a receives the expression code response from the D2D server 306b and derives in operation 624 the network specific entity key ($K_{D2Dser\_UEa}$). Further, the electronic device 100a stores the corresponding codes and the public key of the other electronic devices.

The electronic device 100 registers in operation 626 for D2D service and obtains the expression code along with the Public key ($K_{UEa\_Publickey}$) from the D2D server. The electronic device 100a broadcasts in operation 628 the direct communication message to the electronic device 100 as shown in FIG. 6.

The electronic device 100 monitors in operation 630 for the direct communication message from the electronic device 100a. In an embodiment, the electronic device 100a sends in operation 632 the D2D direct communication message with a digital signature to the electronic device 100. The electronic device 100 verifies in operation 634 the direct communication message using the public key ($K_{UEa\_publickey}$) of the electronic device 100a.

FIG. 7 illustrates a sequence diagram in which the electronic device sends the public key to a Home subscription server (HSS), according to the embodiments as disclosed herein. As depicted in the sequence diagram the electronic device 100a sends in operation 702 the public key ($K_{UEa\_publickey}$) to the HSS 304. In an embodiment, the electronic device 100a sends the list of network entity IDs authorized to obtain the public key. The BSF entity 302 authenticates in operation 704 the electronic device 100a using GBA authentication procedure. The BSF entity 302 and the electronic device 100a obtains the B-TID and the corresponding D2D shared key ($K_{s\_UEa}$) as a result of GBA authentication procedure.

The BSF entity 302 acquires in operation 706 the public key ($K_{UEa\_publickey}$) of the electronic device 100a from the GUSS which is stored in the HSS 304. Further, the BSF entity 302 obtains the list of authorized network entities (to obtain the public key) from the GUSS in the HSS 304. The second electronic device 100a sends in operation 708 the D2D direct configuration or registration request with the B-TID to a Direct Provisioning Function (DPF) entity 306a. Further, the DPF entity 306b sends in operation 710 a key request message with the B-TID and a DPF entity ID to the BSF entity 302. The BSF entity 302 receives the key request from the DPF entity 306a and sends in operation 712 a key response message with a D2D network specific entity key ($K_{DPF\ entity\_UEa}$) and the public key ($K_{UEa\_publickey}$) of the electronic device 100a to the DPF entity 306b.

The DPF entity 306a sends in operation 714 the D2D direct configuration registration response to the electronic device 100a. In an embodiment, the configuration is protected by the D2D network specific entity key ($K_{DPF\ entity\_UEa}$). The electronic device 100a receives the configuration from the DPF entity 306a, derives in operation 716 the $K_{DPF\ entity\_UEa}$ and verifies the configuration obtained from the DPF entity 306a.

The electronic device 100a sends in operation 718 the Get expression code request along with the B-TID to the D2D server 306b. The D2D server 306b obtains the Get expression code request from the electronic device 100a and sends in operation 720 a key request with B-TID and the D2D server ID to the BSF entity 302.

The BSF entity 302 sends in operation 722 the key response with D2D server specific entity key ($K_{D2Dser\_UEa}$) along with the public key to the D2D server 306b. The D2D server 306b sends in operation 724 the expression code response message that includes relevant expression codes of other electronic devices along with the public keys of the other electronic devices to the electronic device 100a. The electronic device 100a receives the expression code response from the D2D server 306b and derives in operation 726 the network specific entity key ($K_{D2Dser\_UEa}$). Further, the electronic device 100a stores the corresponding codes and the public key of the other electronic devices.

The electronic device 100 registers in operation 728 for D2D service and obtains the expression code along with the Public key ($K_{UEa\_Publickey}$) from the D2D server. The electronic device 100a broadcasts in operation 730 the direct communication message to the electronic device 100 as shown in FIG. 7.

The electronic device 100 monitors in operation 732 for the direct communication message from the electronic device 100a. In an embodiment, the electronic device 100a sends in operation 734 the D2D direct communication message with a digital signature to the electronic device 100. The electronic device 100 verifies in operation 736 the direct communication message using the public key ($K_{UEa\_publickey}$) of the electronic device 100a.

FIG. 8 illustrates a sequence diagram in which the electronic device sends the public key to the BSF entity and the BSF entity shares the public key with the D2D server, according to the embodiments as disclosed herein. As depicted in the sequence diagram the electronic device 100a sends in operation 802 the public key ($K_{UEa\_publickey}$) to the BSF entity 302. In an embodiment, the electronic device 100a sends the list of network entity IDs authorized to obtain the public key.

The second electronic device 100a sends in operation 804 the D2D direct configuration or registration request with the B-TID to a Direct Provisioning Function (DPF) entity 306a. Further, the DPF entity 306b sends in operation 806 a key request message with the B-TID and a DPF entity ID to the BSF entity 302. The BSF entity 302 receives the key request from the DPF entity 306a and sends in operation 808 a key response message with a D2D network specific entity key ($K_{DPF\ entity\_UEa}$) and the public key ($K_{UEa\_publickey}$) of the electronic device 100a to the DPF entity 306b.

The DPF entity 306a sends in operation 810 the D2D direct configuration registration response to the electronic device 100a. In an embodiment, the configuration is protected with ($K_{DPF\ entity\_UEa}$).

The electronic device 100a receives the configuration from the DPF entity 306a, derives in operation 812 the $K_{DPF\ entity\_UEa}$ and verifies the configuration obtained from the DPF entity 306a. The electronic device 100a sends in operation 814 a register key message to the D2D server 306b. The Register key message comprises the D2D ID of the electronic device 100a and the B-TID.

The D2D server sends in operation 816 a key request message with B-TID and the D2D server ID to the BSF entity 302. The BSF entity 302 sends in operation 818 the key response with D2D network specific entity key ($K_{D2Dser\_UEa}$) along with the public key to the D2D server. Further, the D2D server 306b stores in operation 820 mapping of the electronic device 100a's D2D ID and the B-TID and/or the public key ($K_{UEa\_publickey}$).

The D2D server 306b, after mapping the electronic device 100a's expression code and B-TID and/or the public key ($K_{UEa\_publickey}$), sends in operation 822 a register key acknowledgment (ACK) message to the electronic device 100a. Further, The electronic device 100a sends in operation 824 a get key request message to the D2D server 306b with the B-TID for requesting the D2D IDs of the other electronic devices (for example, the electronic device 100). The D2D server 306b retrieves in operation 826 the D2D IDs of other electronic devices or UEs and the corresponding public keys of the other electronic devices form the mapping table. In an embodiment, when the public key of other electronic device is unavailable in the D2D server 306b, then the D2D server 306b sends in operation 828 the key request to the BSF entity 302 with the B-TID (of the other electronic device, for example, the electronic device 100) requesting for the public key of the other electronic device. The BSF entity 302 sends in operation 830 the public key of the other electronic device in a key response message to the D2D server 306b.

Further, the D2D server 306b sends in operation 832 a get key response message that includes relevant D2D IDs of other electronic devices along with the public keys of the other electronic devices to the electronic device 100a.

The electronic device 100a receives get key response from the D2D server 306b and derives in operation 834 the network specific entity key ($K_{D2Dser\_UEa}$). Further, the electronic device 100a stores the corresponding codes and the public key of the other electronic devices.

The electronic device 100 registers in operation 836 for D2D services and obtains the expression code along with the public key ($K_{UEa\_Publickey}$) from the D2D server. The electronic device 100a broadcasts in operation 838 the direct communication message to the electronic device 100 as shown in FIG. 8.

The electronic device 100 monitors in operation 840 for the direct communication message from the electronic device 100a. In an embodiment, the electronic device 100a sends in operation 842 the D2D direct communication message with a digital signature to the electronic device 100. The electronic device 100 verifies in operation 844 the direct communication message using the public key ($K_{UEa\_publickey}$) of the electronic device 100a.

FIG. 9 illustrates a sequence diagram in which the electronic device sends the public key to the D2D server in a register key message, according to the embodiments as disclosed herein. As depicted in the sequence diagram the BSF entity 302 authenticates in operation 902 the electronic device 100a using GBA authentication procedure. The BSF entity 302 and the electronic device 100a obtains the B-TID and the corresponding D2D shared key ($K_{s\_UEa}$) as a result of GBA authentication procedure.

The second electronic device 100a sends in operation 904 the D2D direct configuration or registration request with the B-TID to a Direct Provisioning Function (DPF) entity 306a. Further, the DPF entity 306b sends in operation 906 a key request message with the B-TID and a DPF entity ID to the BSF entity 302. The BSF entity 302 receives the key request from the DPF entity 306a and sends in operation 908 a key response message with a D2D network specific entity key ($K_{DPF\ entity\_UEa}$) and to the DPF entity 306b.

The DPF entity 306a sends in operation 910 the D2D direct configuration registration response to the electronic device 100a. In an embodiment, the configuration is protected with ($K_{DPF\ entity\_UEa}$). The electronic device 100a receives the configuration from the DPF entity 306a, derives in operation 912 the $K_{DPF\ entity\_UEa}$ and verifies the configuration obtained from the DPF entity 306a. The electronic device 100a sends in operation 914 a register key message to the D2D server 306b. The Register key message comprises the D2D ID of the electronic device 100a, the B-TID, the MAC and the public key of the electronic device 100a.

The D2D server sends in operation 916 a key request message with B-TID and the D2D server ID to the BSF entity 302. The BSF entity 302 sends in operation 918 the key response with the public key to the D2D server 306b. Further, the D2D server 306b stores in operation 920 mapping of the electronic device 100a's D2D ID and B-TID and/or the public key ($K_{UEa\_publickey}$).

The D2D server 306b, after mapping the electronic device 100a's expression code and B-TID and/or the public key ($K_{UEa\_publickey}$), sends in operation 922 a register key acknowledgment (ACK) message to the electronic device 100a. Further, The electronic device 100a sends in operation 924 a get key request message to the D2D server 306b with the B-TID for requesting the D2D IDs of the other electronic devices (for example, the electronic device 100). The D2D server 306b retrieves in operation 926 the D2D IDs of other electronic devices or UEs and the corresponding public keys of the other electronic devices form the mapping table. In an embodiment, when the public key of other electronic devices are unavailable in the D2D server 306b, then the D2D server 306b sends in operation 928 the key request to the BSF entity 302 with the B-TID (of the other electronic device, for example, the electronic device 100) requesting for the public key of the other electronic device. The BSF entity 302 sends in operation 930 the public key of the other electronic device in a key response message to the D2D server 306b.

Further, the D2D server 306b sends in operation 932 a get key response message that includes relevant D2D IDs of other electronic devices along with the public keys of the other electronic devices to the electronic device 100a.

The electronic device 100a receives the get key response from the D2D server 306b and derives in operation 934 the network specific entity key ($K_{D2Dser\_UEa}$). Further, the electronic device 100a stores the corresponding codes and the public key of the other electronic devices.

The electronic device 100 registers in operation 936 for D2D services and obtains the public key ($K_{UEa\_Publickey}$) of the electronic device 100a. The electronic device 100a broadcasts in operation 938 the direct communication message to the electronic device 100 as shown in FIG. 9.

The electronic device 100 monitors in operation 940 for the direct communication message from the electronic device 100a. In an embodiment, the electronic device 100a sends in operation 942 the D2D direct communication message with a digital signature to the electronic device 100. The electronic device 100 verifies in operation 944 the direct communication message using the public key ($K_{UEa\_publickey}$) of the electronic device 100a.

FIG. 10 illustrates a sequence diagram in which the electronic device sends the public key to the HSS and the D2D server obtains the public key from the BSF entity, according to the embodiments as disclosed herein. As depicted in the sequence diagram the electronic device 100a sends in operation 1002 the public key ($K_{UEa\_publickey}$) to the HSS 304. In an embodiment, the electronic device 100a sends the list of network entity IDs authorized to obtain the public key. The BSF entity 302 authenticates in operation 1004 the electronic device 100a using GBA authentication procedure. The BSF entity 302 and the electronic device 100a obtains the B-TID and the corresponding D2D shared key ($K_{s\_UEa}$) as a result of GBA authentication procedure.

The BSF entity 302 acquires in operation 1006 the public key ($K_{UEa\_publickey}$) of the electronic device 100a from the GUSS which is stored in the HSS 304. Further, the BSF entity 302 obtains the list of authorized network entities (to obtain the public key) from the GUSS in the HSS 304. The second electronic device 100a sends in operation 1008 the D2D direct configuration or registration request with the B-TID to a Direct Provisioning Function (DPF) entity 306a. Further, the DPF entity 306b sends in operation 1010 a key request message with the B-TID and the DPF entity ID to the BSF entity 302. The BSF entity 302 receives the key request from the DPF entity 306a and sends in operation 1012 a key response message with a D2D network specific entity key ($K_{DPF\ entity\_UEa}$) and the public key ($K_{UEa\_publickey}$) of the electronic device 100a to the DPF entity 306b.

The DPF entity 306a sends in operation 1014 the D2D direct configuration registration response to the electronic device 100a. In an embodiment, the configuration is protected by the D2D network specific entity key ($K_{DPF\_entity\_UEa}$). The electronic device 100a receives the configuration from the DPF entity 306a, derives in operation 1016 the $K_{DPF\_entity\_UEa}$ and verifies the configuration obtained from the DPF entity 306a. The electronic device 100a sends in operation 1018 a register key message to the D2D server 306b. The Register key message comprises the D2D ID of the electronic device 100a and the B-TID.

The D2D server sends in operation 1020 a key request message with B-TID and the D2D server ID to the BSF entity 302. The BSF entity 302 sends in operation 1022 the key response with D2D network specific entity key ($K_{D2Dser\_UEa}$) along with the public key of the electronic device 100a to the D2D server 306b. Further, the D2D server 306b stores in operation 1024 mapping of the electronic device 100a's D2D ID and B-TID and/or the public key ($K_{UEa\_publickey}$).

The D2D server 306b, after mapping the electronic device 100a's D2D ID and B-TID and/or the public key ($K_{UEa\_publickey}$), sends in operation 1026 a register key acknowledgment (ACK) message to the electronic device 100a. Further, the electronic device 100a sends in operation 1028 a get key request message to the D2D server 306b with the B-TID for requesting the D2D IDs of the other electronic devices (for example, the electronic device 100). The D2D server 306b retrieves in operation 1030 the D2D IDs of other electronic devices or UEs and the corresponding public keys of the other electronic devices form the mapping table. In an embodiment, when the public key of other electronic device is unavailable in the D2D server 306b, then the D2D server 306b sends in operation 1032 the key request to the BSF entity 302 with the B-TID (of the other electronic device, for example, the electronic device 100) requesting for the public key of the other electronic device. The BSF entity 302 sends in operation 1034 the public key of the other electronic device in a key response message to the D2D server 306b.

Further, the D2D server 306b sends in operation 1036 a get key response message that includes relevant D2D IDs of other electronic devices along with the public keys of the other electronic devices to the electronic device 100a.

The electronic device 100a receives get key response from the D2D server 306b and derives in operation 1038 the network specific entity key ($K_{D2Dser\_UEa}$). Further, the electronic device 100a stores the corresponding codes and the public key of the other electronic devices.

The electronic device 100 registers in operation 1040 for D2D services and obtains the expression code along with the public key ($K_{UEa\_Publickey}$) from the D2D server. The electronic device 100a broadcasts in operation 1042 the direct communication message to the electronic device 100 as shown in FIG. 8.

The electronic device 100 monitors in operation 1044 for the direct communication message from the electronic device 100a. In an embodiment, the electronic device 100a sends in operation 1046 the D2D direct communication message with a digital signature to the electronic device 100. The electronic device 100 verifies in operation 1048 the direct communication message using the public key ($K_{UEa\_publickey}$) of the electronic device 100a.

In an embodiment, the method utilizes GBA to send Prose device specific keys to a network after mutual authentication. The method also utilizes GBA to distribute keys of an authenticated prose electronic device in a network supporting direct communication to other authorized network entities. Further, the method distributes keys between the authenticated prose devices in a network supporting direct communication using ProSe signaling message for the identity authenticity verification. The method extends the GBA to support authenticity verification of direct communication devices. Leveraging the use of GBA in ProSe key distribution for entities and devices supporting direct communication.

The method causes the device having a ProSe identity to be tethered with the public key of the device in the network for its identity authenticity verification when communicating directly with other devices, when electronic devices are in network coverage or when electronic devices are out-of-coverage.

The method also discloses the mechanism of securing the discovery by the electronic device and the network by deriving digital signature using at least one network controlled parameter with timestamp and public key of the announcing ProSe UE.

In another embodiment, Utilizing Long Term Evolution (LTE) control plane signaling message to send Prose device specific keys to a network after mutual authentication. The method also utilizes Long Term Evolution (LTE) control plane signaling to distribute keys of an authenticated prose device in a network supporting direct communication to other authorized network entities. Further, the method distributes keys between the authenticated prose devices in a network supporting direct communication using ProSe signaling message for the identity authenticity verification. The method extends the Long Term Evolution (LTE) signaling to support authenticity verification of direct communication devices. Leveraging the use of Long Term Evolution (LTE) signaling in ProSe key distribution for entities and devices supporting direct communication.

FIG. 11 illustrates a computing environment implementing the method for identity verification of the direct communication message using asymmetric keys in the wireless communication network, according to the embodiments as disclosed herein. As depicted the computing environment 1102 comprises at least one processing unit 604 that is equipped with a control unit 1104 and an Arithmetic Logic Unit (ALU) 1106, a memory 1110, a storage unit 1112, plurality of networking devices 608 and a plurality Input output (I/O) devices 1114. The processing unit 1108 is responsible for processing the instructions of the algorithm. The processing unit 1108 receives commands from the control unit in order to perform its processing. Further, any logical and arithmetic operations involved in the execution of the instructions are computed with the help of the ALU 1106.

The overall computing environment 1102 can be composed of multiple homogeneous and/or heterogeneous cores, multiple CPUs of different kinds, special media and other accelerators. The processing unit 1108 is responsible for processing the instructions of the algorithm. Further, the plurality of processing units 1108 may be located on a single chip or over multiple chips.

The algorithm comprising of instructions and codes required for the implementation are stored in either the memory unit 1110 or the storage 1112 or both. At the time of execution, the instructions may be fetched from the corresponding memory 1110 and/or storage 1112, and executed by the processing unit 1108.

In case of any hardware implementations various networking devices 1116 or external I/O devices 1114 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1-3 and 5-11 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for supporting a device to device direct communication between electronic devices by a network server in a wireless communication network, the method comprising:
    receiving, by the network server, a request message for the device to device direct communication from a first electronic device;
    verifying, by the network server, a user identity of the first electronic device in response to receiving the request message;
    transmitting, by the network server, a response message comprising a private key corresponding to the user identity of the first electronic device; and
    receiving, by the network server from the first electronic device, the public key and a list of network entities authorized to obtain the public key,
    wherein the first electronic device is configured to broadcast a discovery announcement message signed using the private key,
    wherein at least one second electronic device which intends to communicate with the first electronic device is configured to:
        obtain a public key associated with the user identity of the first electronic device from the network server,
        receive the discovery announcement message when the at least one second electronic device is out of a network coverage of the wireless communication network, and
        verify the discovery announcement message using the public key associated with the user identity of the first electronic device, and
    wherein the public key is associated with the user identity being specific to application running on the first electronic device.

2. The method of claim 1, wherein the at least one second electronic device is configured to obtain the public key when the at least one second electronic device registers for the device to device direct communication of the wireless communication network.

3. A method for performing a device to device direct communication by a first electronic device in a wireless communication network, the method comprises:
    transmitting a request message for the device to device direct communication to a network server;
    receiving a response message comprising a private key corresponding to a user identity of the first electronic device;
    broadcasting a discovery announcement message signed using the private key; and
    transmitting, by the first electronic device to the network server, the public key and a list of network entities authorized to obtain the public key,
    wherein at least one second electronic device which intends to communicate with the first electronic device is configured to:
        obtain a public key associated with the user identity of the first electronic device from the network server,
        receive the discovery announcement message when the at least one second electronic device is out of a network coverage of the wireless communication network, and
        verify the discovery announcement message using the public key associated with the user identity of the first electronic device, and
    wherein the public key is associated with the user identity being specific to application running on the first electronic device.

4. The method of claim 3, wherein the at least one second electronic device is configured to obtain the public key when the at least one second electronic device registers for the device to device direct communication of the wireless communication network.

5. An apparatus of a network server for supporting a device to device direct communication between electronic devices in a wireless communication network, the apparatus comprises:
    a transceiver configured to:
        receive a request message for the device to device direct communication from a first electronic device, and
        transmit a response message comprising a private key corresponding to a user identity of the first electronic device;
        receive, from the first electronic device, the public key and a list of network entities authorized to obtain the public key; and
    a processor configured to verify the user identity of the first electronic device in response to receiving the request message,
    wherein the first electronic device is configured to broadcast a discovery announcement message signed using the private key,
    wherein at least one second electronic device which intends to communicate with the first electronic device is configured to:
        obtain a public key associated with the user identity of the first electronic device from the network server,
        receive the discovery announcement message when the at least one second electronic device is out of a network coverage of the wireless communication network, and
        verify the discovery announcement message using the public key associated with the user identity of the first electronic device, and
    wherein the public key is associated with the user identity being specific to application running on the first electronic device.

6. The apparatus of claim 5, wherein the at least one second electronic device is configured to obtain the public key when the at least one second electronic device registers for the device to device direct communication of the wireless communication network.

7. An apparatus of a first electronic device for performing a device to device direct communication in a wireless communication network, the apparatus comprising:
 a transceiver configured to:
  transmit a request message for the device to device direct communication to a network server,
  receive a response message comprising a private key corresponding to a user identity of the first electronic device,
  broadcast a discovery announcement message signed using the private key, and
  transmit, to the network server, the public key and a list of network entities authorized to obtain the public key; and
 a controlling module configured to control the transceiver,
 wherein at least one second electronic device which intends to communicate with the first electronic device is configured to:
  obtain a public key associated with the user identity of the first electronic device from the network server,
  receive the discovery announcement message when the at least one second electronic device is out of a network coverage of the wireless communication network, and
  verify the discovery announcement message using the public key associated with the user identity of the first electronic device, and
 wherein the public key is associated with the user identity being specific to application running on the first electronic device.

8. The apparatus of claim 7, wherein the at least one second electronic device is configured to obtain the public key when the at least one second electronic device registers for the device to device direct communication of the wireless communication network.

* * * * *